(12) United States Patent
Javaid et al.

(10) Patent No.: US 8,605,621 B2
(45) Date of Patent: Dec. 10, 2013

(54) METHODS AND DEVICES FOR DISCOVERING A GATEWAY AND FOR ROUTING TOWARDS SAID GATEWAY IN A HYBRID WIRELESS NETWORK

(75) Inventors: Usman Javaid, Newbury (GB); Djamal-Eddine Meddour, Lannion (FR)

(73) Assignee: France Telecom, Paris (FR)

( * ) Notice: Subject to any disclaimer, the term of this patent is extended or adjusted under 35 U.S.C. 154(b) by 493 days.

(21) Appl. No.: 12/526,249

(22) PCT Filed: Jan. 29, 2008

(86) PCT No.: PCT/FR2008/050142
§ 371 (c)(1), (2), (4) Date: Aug. 6, 2009

(87) PCT Pub. No.: WO2008/110715
PCT Pub. Date: Sep. 18, 2008

(65) Prior Publication Data
US 2010/0008261 A1    Jan. 14, 2010

(30) Foreign Application Priority Data

Feb. 16, 2007 (FR) ..................................... 07 53307

(51) Int. Cl.
*H04L 12/28* (2006.01)
*H04L 12/56* (2011.01)
*H04W 4/00* (2009.01)
*H04W 40/00* (2009.01)

(52) U.S. Cl.
USPC ............ 370/254; 370/338; 370/401; 455/445

(58) Field of Classification Search
USPC ................ 370/254–293, 338–346, 401–492; 455/420–425, 427–445; 709/242–245
See application file for complete search history.

(56) References Cited

U.S. PATENT DOCUMENTS

| | | | |
|---|---|---|---|
| 6,936,566 B2 * | 8/2005 | Mees et al. ..................... | 502/214 |
| 7,397,789 B2 * | 7/2008 | Chari et al. .................... | 370/351 |
| 7,593,376 B2 * | 9/2009 | D'Amico et al. ............. | 370/338 |
| 7,620,366 B2 * | 11/2009 | Kim et al. ..................... | 455/41.2 |
| 7,668,146 B2 * | 2/2010 | Levendel et al. .............. | 370/338 |
| 7,853,204 B2 * | 12/2010 | Tan et al. ...................... | 455/13.1 |

(Continued)

FOREIGN PATENT DOCUMENTS

WO    WO 02/054646    7/2002

OTHER PUBLICATIONS

H-Y. Wei et al., "Two-Hop-Relay Architecture for Next-Generation WWAN/WLAN Integration", IEEE Wireless Communications, IEEE Service Center, vol. 11, No. 2, pp. 24-30, Apr. 2004.

(Continued)

*Primary Examiner* — Man Phan
(74) *Attorney, Agent, or Firm* — Knobbe Martens Olson & Bear LLP (57) ABSTRACT

A gateway (25) between an ad hoc network (5) and a fixed network (2) in a hybrid telecommunications network (1) selects, from amongst candidate nodes (10) of the ad hoc network (5) that are located one hop from that gateway (25) and that have connectivity with that gateway (25) above a predetermined threshold, at least one gateway node (10') for relaying at least part of the traffic between other nodes (10) of the ad hoc network (5) and the gateway (25).

14 Claims, 3 Drawing Sheets

(56) References Cited

U.S. PATENT DOCUMENTS

| | | | |
|---|---|---|---|
| 2002/0107023 A1* | 8/2002 | Chari et al. ................... | 455/445 |
| 2004/0008663 A1* | 1/2004 | Srikrishna et al. ............ | 370/351 |
| 2007/0147315 A1* | 6/2007 | Khoury et al. ................ | 370/338 |
| 2008/0002640 A1* | 1/2008 | Westphal ...................... | 370/338 |

OTHER PUBLICATIONS

K.N. Amouris et al., "A position-based multi-zone routing protocol for wide area mobile ad-hoc networks", Vehicular Technology Conference, 1999 IEEE, vol. 2, No. 16, pp. 1365-1369, May 16, 1999.

* cited by examiner

METHODS AND DEVICES FOR DISCOVERING A GATEWAY AND FOR ROUTING TOWARDS SAID GATEWAY IN A HYBRID WIRELESS NETWORK

RELATED APPLICATIONS

This is a U.S. National Phase Application under 35 USC §371 of International Application PCT/FR2008/050142, filed on Jan. 29, 2008.

This application claims the priority of French application no. 7/53307 filed on Feb. 16, 2007, and the content of which is hereby incorporated by reference.

BACKGROUND OF THE INVENTION

The invention relates to routing in ad hoc telecommunications networks.

An ad hoc telecommunications network is a network in which mobile units called nodes are free to move and to communicate wirelessly with one another.

These networks have the advantage of being very flexible, each mobile unit being adapted to route traffic in order to create paths between the nodes.

However, it is very difficult to achieve efficient routing in an ad hoc network that includes a large number of nodes.

One known approach to solving this scalability problem integrates ad hoc networks and fixed networks, for example IP networks.

The result is called a hybrid network.

Thus, as known in the art, a hybrid network is primarily composed of ad hoc networks interconnected by a fixed infrastructure network, the interface between an ad hoc network and the fixed infrastructure network being provided by units known interchangeably as gateways or access points.

When a message is to be routed between two nodes of an ad hoc network, the best path between those nodes is determined, and may optionally pass through the gateway.

A gateway discovery problem arises in a hybrid telecommunications network at the nodes of the ad hoc network requiring access to the fixed infrastructure network.

In a so-called proactive scheme, the gateway periodically broadcasts advertisement messages over the ad hoc network to provide the nodes of that network with information for identifying a path to the gateway. These proactive schemes offer good connectivity but have often been criticized because they occupy bandwidth in the ad hoc network unnecessarily, especially when some nodes do not need connectivity with the fixed network.

In a so-called reactive scheme, only nodes that need to access the fixed infrastructure network seek to identify a gateway by broadcasting a solicitation message in the network. In that scheme, bandwidth is used inefficiently if a large number of nodes require connectivity with the fixed network.

Also known in the art are hybrid schemes that exploit the advantages of proactive and reactive schemes. In those hybrid schemes, the gateway broadcasts the advertisement messages periodically but, in contrast to proactive schemes, the messages are not broadcast throughout the network, but only to a particular depth expressed as a plurality of hops from the gateway.

A first problem is to determine the depth and the period between two successive broadcasts of the advertisement message.

Moreover, it is clear that the mobile nodes situated nearby, and especially those located one hop from the gateway, are heavily loaded by traffic between the other nodes of the network and the fixed infrastructure.

That represents a major drawback if those nodes do not have sufficient capacity to support the traffic.

OBJECT AND SUMMARY OF THE INVENTION

A first aspect of the invention relates to a method of discovering a gateway and routing data towards the gateway, which gateway is between an ad hoc network and a fixed network in a hybrid telecommunications network. The method includes a step of selecting, from among, candidate nodes of the ad hoc network that are located one hop from the gateway and that have connectivity with the gateway that is above a predetermined threshold, at least one gateway node for relaying at least part of the traffic between other nodes of the ad hoc network and the gateway.

Thus the invention defines the concept of a gateway node, referring to mobile nodes of the ad hoc network that are located one hop from the gateway, that have good connectivity with the gateway, and that are candidates for relaying at least part of the traffic between the other nodes of the ad hoc network and the gateway, especially if the other nodes generate traffic with the fixed infrastructure network.

In one particular implementation of the invention, a node is considered to have good connectivity with the gateway if the signal-noise ratio measured by that node on dedicated beacon messages sent by the gateway is above a predetermined threshold.

According to the invention, selection of gateway nodes can be centralized or distributed.

In a centralized selection mode, the nodes requesting to be registered as gateway nodes send a message to the gateway, which accepts or rejects that request.

In a distributed selection mode, the agreement of the gateway is not necessary.

In one particular implementation, once a gateway node is selected, that node is registered in a topological table of the gateway.

In one particular implementation of the invention, the discovery and routing method includes:

- a step of broadcasting only to the gateway node(s) an advertisement message including a route to said gateway; and
- a step of hop-by-hop rebroadcasting of the advertisement message in the ad hoc network by each of the nodes receiving the message at least to a depth fixed by the gateway and defining a proactive area of the network.

As in the prior art, a proactive area of the ad hoc network is thus defined by a depth to which advertisement messages are broadcast, i.e. by a number of hops, known as the time to live (TTL) depth.

However, according to an embodiment of the invention, these advertisement messages are not broadcast by the gateway to all its neighbours, but only to the gateway nodes. This protects the other neighbours of the gateway from traffic generated by the nodes of the ad hoc network when they access the fixed infrastructure network.

As indicated above, there is no optimum value for this TTL depth.

Also, in one particular implementation, the discovery and routing method of the invention includes a step of extending the proactive area during which at least one node of the ad hoc network rebroadcasts the advertisement message if that node knows of at least one active source in the ad hoc network separated from the gateway by a plurality of hops greater than said depth.

This method is highly advantageous in that it progressively broadcasts the advertisement message to all active sources, even if they are outside the proactive area.

In one particular implementation of the invention, a node of the network becomes an active source as soon as it commences to send data to the gateway, and ceases to be an active source if it does not communicate with the gateway for a predetermined period.

In one particular implementation of the invention, each intermediate node that forwards data sent by an active source to the gateway updates the list of active sources of the network and the number of hops between the active source and the gateway.

For example, if the TTL depth initially set by the gateway is 3, a node of the proactive area knowing the existence of an active source located 5 hops from the gateway rebroadcasts the advertisement message in order to extend the proactive area to cover that source.

In a preferred implementation of the invention, during extension of the proactive area, for improved management of the bandwidth in the ad hoc network, the advertisement message is sent only to the nodes able to set up a path to an active source.

In one particular implementation, the discovery and routing method of the invention includes a step of the gateway determining the depth in order to maximize a gain taking account of the number of active sources in the proactive area and of a cost criterion.

In this implementation, the gateway holds topological information on the number of nodes connected and the depth of each of those nodes. For each possible depth t, it can thus determine the number $N_c(t)$ of nodes in the proactive area of depth t.

The gateway can then choose the optimum TTL depth by maximizing the gain $\delta(t)$ defined by the ratio between the number $S_c(t)$ of active sources located in the proactive area of depth t and a cost $C_f(t)$ of maintaining that proactive area.

In one implementation, the cost of maintaining the proactive area is equal to the sum of the costs of maintaining each of the active sources in that area.

In one particular implementation, the cost of maintaining an active source is equal to the number of hops that separate that active source from the gateway.

In one particular implementation of the invention, the discovery and routing method includes a step in which, between two successive broadcasts of the advertisement message, the gateway waits for a period calculated by the gateway taking account of the activity and of the mobility of the nodes of the ad hoc network.

The activity Ai in the network can be defined as the ratio between the number S of active sources and the total number N of nodes in the ad hoc network.

The mobility Mi can be defined as the ratio between the number M of nodes that have moved in the ad hoc network during a period of time and the total number N of nodes. The nodes that join or quit the ad hoc network during this period can also be considered as mobile nodes.

In one particular implementation, the discovery and routing method of the invention includes a step of the gateway adjusting the TTL depth to satisfy at least one rule aiming to distribute the traffic between the gateway and at least one other neighbour gateway.

This rule can be part of a more general hybrid network management policy.

In one particular implementation, the fixed infrastructure of the hybrid network includes an entity responsible for implementing this policy, adapted to assure good distribution of the traffic between the different gateways (this is known as load balancing).

In this scheme, this entity can send a message to a gateway to request it to extend or reduce the proactive area, which is reflected in a reduction or an increase in the depth.

It is moreover clear that the nodes of the proactive area are subject to higher traffic than the others because they route traffic between the nodes of the ad hoc network and a fixed network.

It is therefore important, if the users of these units are to agree to provide this service, to remunerate them one way or another.

This remuneration policy has a cost that the operator seeks to minimize.

To this end, in one particular implementation, the discovery and routing method of the invention includes a step during which the gateway reduces the depth and a period between two successive broadcasts of the advertisement message if the activity of the nodes of the ad hoc network decreases.

In practice, a plurality of gateway nodes are frequently selected.

Consequently, a node of the ad hoc network receives the advertisement message sent by the gateway from a plurality of gateway nodes.

In one particular implementation, the discovery and routing method of the invention includes a step during which a node of the ad hoc network that has received a plurality of said advertisement messages refrains from rebroadcasting at least one of those advertisement messages if it is received from a gateway node offering a relatively low quality of service.

This relieves gateway nodes offering a reduced quality of service at a given time.

In one particular implementation, the discovery and routing method of the invention includes:
  a step in which the gateway node inserts into the advertisement message a measurement of the quality of the link between this gateway node and the gateway;
  a step in which at least one of the nodes updates a measurement representing the quality of at least some existing paths between that node and a gateway node; and
  a step in which that node selects one of the paths for routing the traffic between that node and the gateway as a function of said measurements.

Thus each node can choose the best path for routing traffic sent by an active source to the gateway taking account of the quality of the link between the gateway node and the gateway and of the quality of the path between it and the gateway node.

Thus quality of service is managed end-to-end.

A second aspect of the invention relates to a gateway adapted to be used in a hybrid telecommunications network between an ad hoc network and a fixed network. It includes means for selecting, from among candidate nodes of the ad hoc network that are located one hop from the gateway and that have connectivity with said gateway that is above a predetermined threshold, at least one gateway node for relaying at least part of the traffic between other nodes of the ad hoc network and said gateway.

In a correlated way, the invention is also directed to a method of managing a hybrid telecommunications network that can be implemented by a gateway between an ad hoc network and a fixed network. This management method includes a step of selecting, from amongst candidate nodes of said ad hoc network that are located one hop from the gateway and that have connectivity with said gateway that is above a predetermined threshold, at least one gateway node for relaying at least part of the traffic between other nodes of the ad hoc network and said gateway.

The advantages and particular features of the gateway and of the management method of the invention are the same as those referred to above.

Thus, in one particular implementation, the management method of the invention includes a step of broadcasting only to the gateway node or nodes an advertisement message including a route to the gateway.

In one particular implementation, the management method of the invention includes a step of determining the depth in order to maximize a gain taking account of the number of active sources in the proactive area and of a cost criterion.

In one particular implementation, the management method of the invention includes a step of calculating a period that takes account of the activity and of the mobility of the nodes of the ad hoc network and a step of waiting for that period between two successive broadcasts of the advertisement message.

In one particular implementation, the management method of the invention includes a step of adjustment of the TTL depth to satisfy at least one rule aiming to improve the distribution of traffic between the gateway and at least one other neighbour gateway of that gateway.

In one particular implementation, the management method of the invention includes a step of reducing the TTL depth and a period between two successive broadcasts of the advertisement message if the activity of the nodes of the ad hoc network decreases.

A third aspect of the invention relates to a node of an ad hoc network. That node includes:
  means for verifying whether said node is located one hop from a gateway between the ad hoc network and a fixed network and whether it has a connectivity with said gateway above a predetermined threshold; and
  means for requesting its registering by the gateway as a gateway node for relaying at least part of the traffic between other nodes of the ad hoc network and the gateway.

In a correlated way the invention relates to a data transfer method adapted to be used by a node of an ad hoc network. This transfer method includes:
  a step during which said node verifies whether it is located one hop from a gateway between the ad hoc network and a fixed network and if it has connectivity with said gateway above a predetermined threshold; and, if so:
  a step of requesting registering of said node by the gateway as a gateway node for relaying at least part of the traffic between other nodes of the ad hoc network and said gateway.

The advantages and particular features of the node and the transfer method according to the invention are the same as those referred to above.

Thus, in one particular implementation, the transfer method of the invention includes:
  a step of receiving an advertisement message including a route to the gateway; and
  a step of each node rebroadcasting the advertisement message in the ad hoc network if said node is located in a proactive area of the network defined by a depth fixed by said gateway.

In one particular implementation, the transfer method of the invention further includes a step of extending the proactive area during which the node rebroadcasts the advertisement message if said node knows of at least one active source in the ad hoc network that is separated from the gateway by a number of hops greater than the TTL depth.

In one particular implementation, the transfer method of the invention includes a step during which the node, having received a plurality of advertisement messages, refrains from rebroadcasting at least one of said advertisement messages if it is received from a gateway node offering a relatively low quality of service.

In one particular implementation, the transfer method of the invention includes:
  if said node is listed as a gateway node, a step of inserting into the advertisement message a measurement of the quality of the link between said gateway node and said gateway; and, in all circumstances:
  a step of updating a measurement representing the quality of each existing path between said node and said a gateway node; and
  a step of selecting one of said paths for routing traffic to the gateway as a function of said measurements.

The invention is also directed to a system for discovering a gateway and routing data towards that gateway. That system includes at least one gateway and a plurality of nodes as referred to above.

In one particular implementation, the various steps of the management method and/or the data transfer method are determined by instructions of computer programs.

Consequently, the invention is also directed to a computer program on a data medium, adapted to be executed in a gateway or more generally in a computer, and including instructions adapted to execute the steps of a management method as described above.

The invention is further directed to a computer program on a data medium, adapted to be executed in a node or more generally in a computer, and including instructions adapted to execute the steps of a data transfer method as described above.

These programs can use any programming language and take the form of source code, object code, or a code intermediate between source code and object code, such as a partially-compiled form, or any other desirable form.

The invention is also directed to a computer-readable data medium containing instructions of a computer program as referred to above.

The data medium may be any entity or device capable of storing the program. For example, the support can include storage means, such as a ROM, for example a CD ROM or a microelectronic circuit ROM, or magnetic storage means, for example a floppy disk or a hard disk.

Moreover, the data medium may be a transmissible medium such as an electrical or optical signal, which can be routed via an electrical or optical cable, by radio, or by other means. The program of the invention may in particular be downloaded over an IP network.

Alternatively, the data medium may be an integrated circuit in which the program is incorporated, the circuit being adapted to execute the method in question or to be used in its execution.

BRIEF DESCRIPTION OF THE DRAWINGS

Other features and advantages of the present invention emerge from the description given below with reference to the appended drawings, which show one non-limiting implementation of the present invention. In the figures.

DETAILED DESCRIPTION OF THE DRAWINGS

Figure 1:
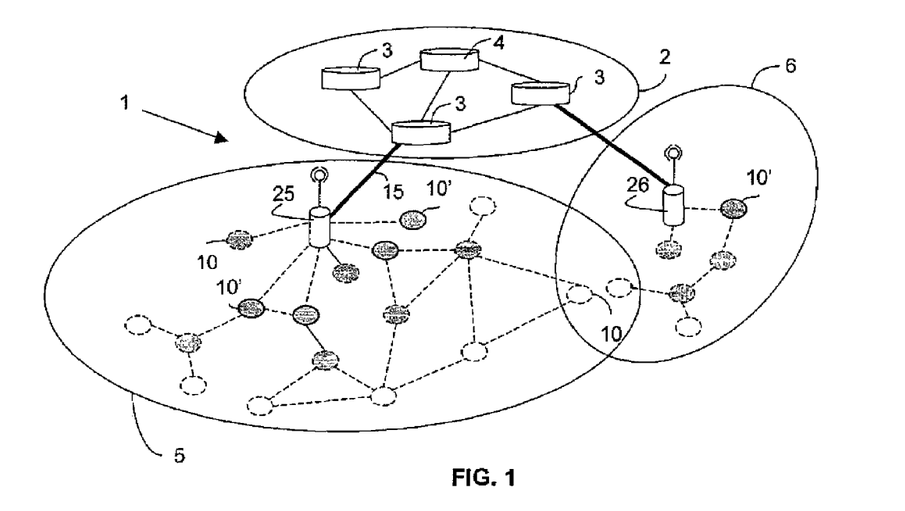
FIG. 1 represents a hybrid network in which a routing method of the invention can be used.

FIG. 1 represents diagrammatically a hybrid network 1 in which a routing method of the invention is used.

This hybrid network 1 consists of a fixed infrastructure network 2 and two ad hoc networks 5 and 6.

In the implementation described here, the fixed infrastructure network 2 is the Internet.

The ad hoc networks 5 and 6 are defined by respective gateways 25, 26 connected to an entity 3 of the Internet 2.

An entity 4 on the Internet 2 is adapted to achieve load balancing between the gateways 25 and 26.

In FIG. 1, the wireless connections set up between the mobile nodes within an ad hoc network 5, 6 and between some of those nodes and the gateways 25, 26 are represented in dashed line.

The nodes 10 within the proactive areas of each of the ad hoc networks 5 and 6 are shown shaded.

In the example described here, the proactive areas of the ad hoc networks 5 and 6 have depths equal to 2 and 3, respectively.

The nodes 10' of the ad hoc networks 5, 6 registered in the gateways 25, 26 as gateway nodes are represented by a solid line contour.

Note that these gateway nodes are all located one hop away from the gateway 25, 26 in which they are listed.

Note also that not all the nodes located one hop from a gateway are listed as gateway nodes.

In the FIG. 1 example, the ad hoc networks 5 and 6 partly overlap. However, each of the nodes 10 located in this overlap area knows one or more routes to only one of the gateways 25, 26 for access to the Internet 2.

According to the invention, the entity 4 of the Internet 2 can send the gateways 25, 26 requests to adjust their respective proactive areas to improve the distribution of traffic between the gateways.

Figure 2:
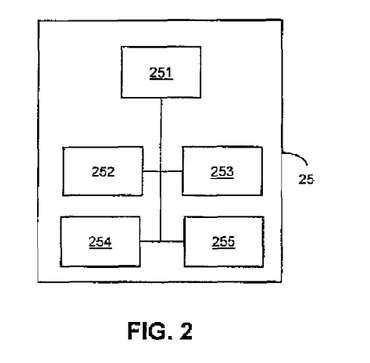
FIG. 2 represents diagrammatically a gateway of one particular implementation of the invention.

FIG. 2 represents diagrammatically the gateway 25. This gateway conforms to one particular implementation of the invention.

In the example described here, the gateway 25 has the conventional architecture of a computer.

It includes a processor 251, a random-access memory (RAM) 252, and a read-only memory (ROM) 253.

The random-access memory 252 contains a topological table in which the gateway nodes 10' are listed.

Figure 4:
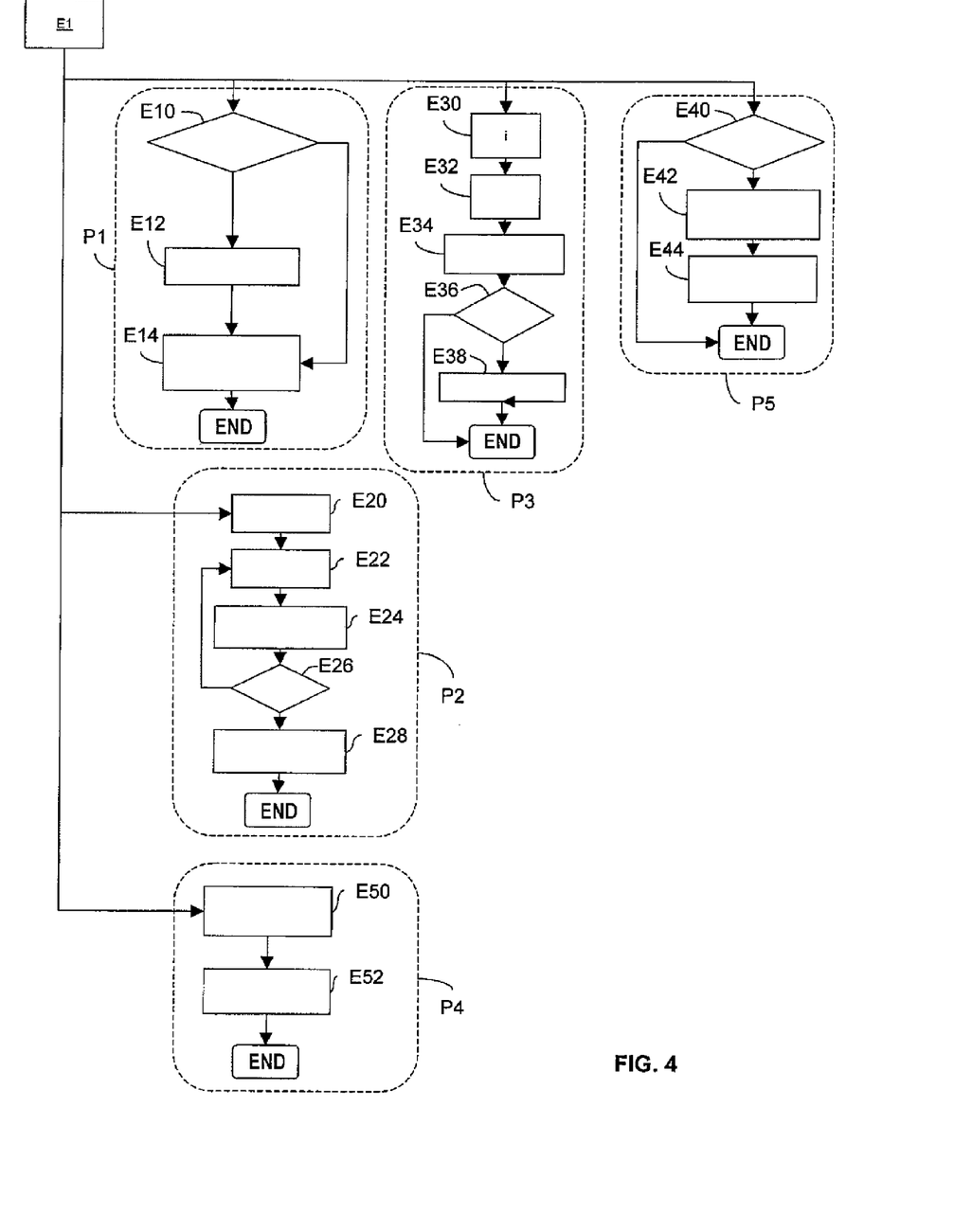
FIG. 4 represents in flowchart form the main steps of a management method of the invention.

The read-only memory 253 contains a computer program of the invention including instructions for executing the steps of the management method of the invention, those steps being represented in the FIG. 4 flowchart.

The gateway 25 also includes communication means 254 for communicating with an entity 3 of the Internet 2 and wireless communication means 255 for communicating with the ad hoc network nodes 10, 10'.

Figure 3:
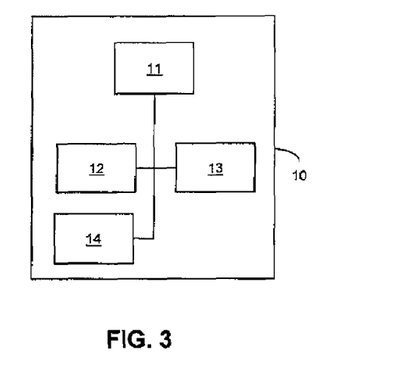
FIG. 3 represents diagrammatically a node of one particular implementation of the invention.

FIG. 3 represents diagrammatically a node 10, 10'. This node conforms to one particular implementation of the invention.

In the example described here, the nodes 10, 10' are identical. They have the conventional architecture of a computer.

They include a processor 11, a random-access memory (RAM) 12, and a read-only memory (ROM) 13.

Figure 5:
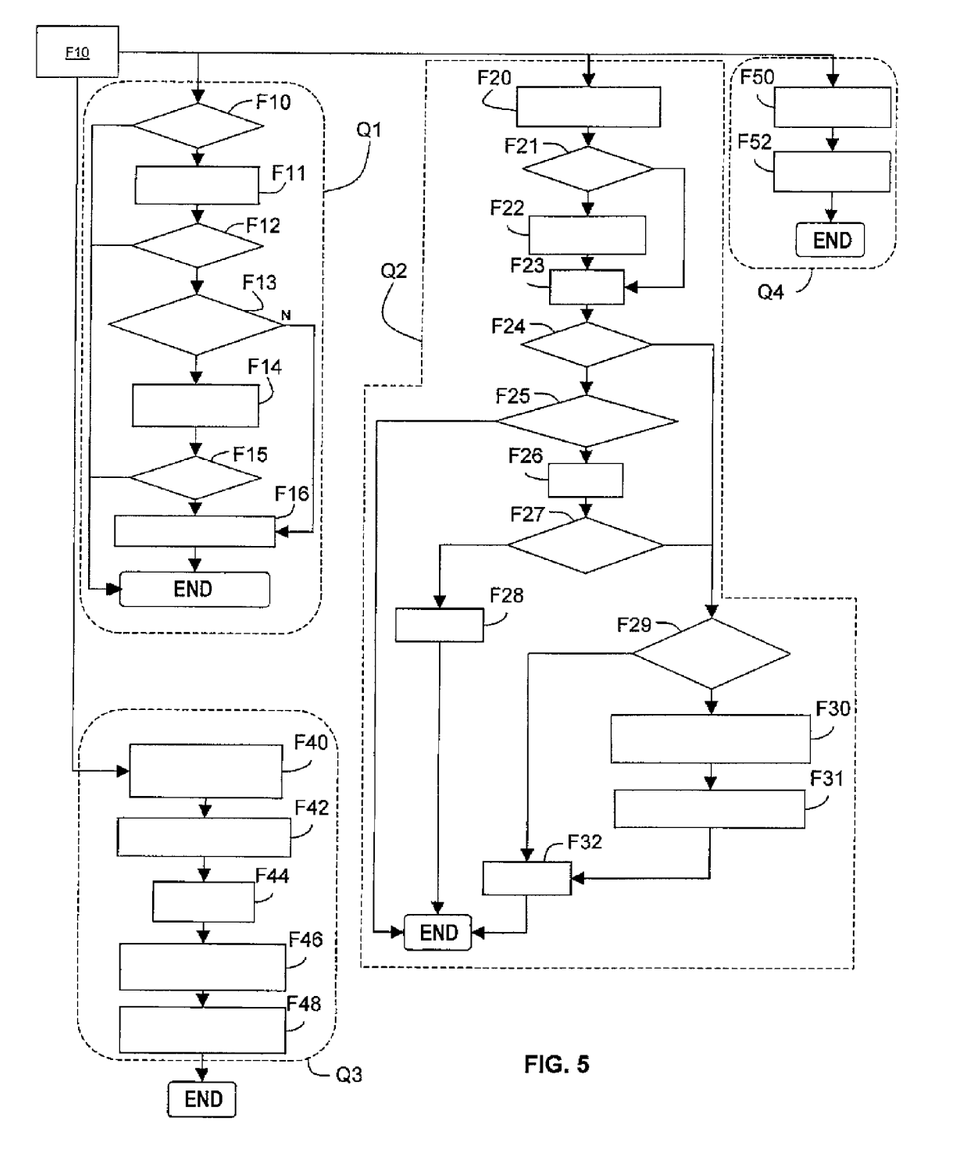
FIG. 5 represents in flowchart form the main steps of a data transfer method of the invention.

This read-only memory 13 contains a computer program of the invention, that program including instructions for executing the steps of the data transfer method of the invention, those steps being represented in the FIG. 5 flowchart.

The nodes 10, 10' also include communication means 14 for communicating wirelessly with the other nodes of the ad hoc network 10, 10' and the gateways 25, 26.

A routing method of the invention used in the hybrid network 1 is described below.

In the implementation described here, this routing method is split between the gateways 25, 26 and between the nodes 10, 10'.

The part of the routing method executed by a gateway 25, 26 corresponds to the management method of the invention used by that gateway.

The part of the routing method used by a node 10, 10' corresponds to the data transfer method of the invention used by that node.

Referring to FIG. 4, the network management method described here includes a general step E1 adapted to manage five processes:

process P1: registering the gateway nodes 10' in the topological table stored in the random-access memory 252;

process P2: determining TTL depth;

process P3: determining waiting time Si between two successive broadcasts of advertisement messages by the gateway;

process P4: adjusting TTL depth on reception of a request sent by the entity 3 of the Internet 2; and process P5: broadcasting advertisement message.

Referring to FIG. 5, the data transfer method described here includes a general step F1 adapted to manage four processes:

process Q1: registering the gateway nodes 10' in the topological table of a gateway;

process Q2: processing on reception of an advertisement message;

received by determination of the TTL depth;

process Q3: routing data received from an active source;

process Q4: detecting end of activity of an active source.

The processes P1 and Q1 for registering gateway nodes 10' in the topological table of a gateway 25, 26 are described below.

Each node 10 of an ad hoc network verifies, during a step F10, if it is a candidate to become a gateway node.

This can be effected by verifying a configuration parameter of the node.

If a node is not a candidate, the process Q1 terminates.

In contrast, if a node 10 is a candidate, that node 10, during a step F11, calculates a signal/noise ratio from a beacon message received from a gateway 25, 26 to evaluate its connectivity with that gateway.

This signal/noise ratio is compared to a threshold during a step F12.

If the signal/noise ratio is below this threshold, the process Q1 terminates.

If not, the node 10 verifies during a step F13 if the gateway nodes are selected in a centralized or distributed manner.

If selection is distributed, during a step F16 the node 10 sends a registering request to the gateway concerned so that it can register that node in its topological table.

In contrast, if selection is centralized, the node 10, during a step F14, sends an authorization request to the gateway concerned. Then, in a step F15, the node 10 processes the response of the gateway. If the gateway refuses the request, the process Q1 terminates. If the gateway accepts the request, the node 10, during the step F16 already described, sends the registering request to the gateway concerned so that it lists that node in its topological table.

The step F16 of sending said listing request terminates the process Q1.

If a gateway receives an authorization request from a node 10, it verifies, during a step E10, if selection of the gateway node is centralized. If not it registers the node 10 in its topological table during a step E14.

If so, during a step E12, it sends a response to the authorization request representing its acceptance or rejection.

If a gateway receives an express registering instruction, either because selection is distributed or because it has previously responded positively to an authorization request to that effect, it performs the registration as described above with reference to the step E14.

The process P2 used by a gateway 25, 26 to determine the TTL depth is described below. In this example the depth is determined to maximize a gain taking account of the number of active sources in the proactive area and of a cost criterion.

During a step E20, the gateway initializes a variable t to zero.

During a step E22, this variable t is incremented.

Then a gain $\delta(t)$ defined by the ratio between the number $S_c(t)$ of active sources located in the proactive area of depth t and a cost $C_f(t)$ of maintaining that proactive area is calculated during a step E24.

In the implementation described here, $C_f(t)$ is equal to the sum, for all the active sources in the area, of the number of hops between that active source and the gateway.

For example, if there are only two active sources in a proactive area of radius 10, respectively separated by three and four hops from the gateway, the cost $C_f(t)$ of maintaining this area is equal to 7.

During a step E26, it is verified if the variable t is equal to the maximum authorized depth.

If not, the steps E22 to E26 are repeated to calculate gains $\delta(t)$ for all the authorized depths t.

Then, during a step E28, the TTL value is chosen to maximize the gain $\delta(TTL)$.

This step terminates the process P2.

The process P3 used by a gateway 25, 26 to determine the waiting time Si between two successive broadcasts of the advertisement message by the gateway is described below.

During a step E30, the gateway calculates an activity Ai defined by the ratio between the number S of active sources and the total number of nodes.

Alternatively, the average number $H_{avg}$ of hops separating these sources from the gateway can also be taken into account:

$$AI \leftarrow \Omega \times \frac{S}{N} + (1 - \Omega) \times \frac{H_{avg}}{H_{max}}$$

where $H_{max}$ is a maximum number of hops separating an active source and the gateway and $\Omega$ is a weight between 0.6 and 1.

During a step E32, the gateway calculates a mobility Mi defined by the ratio between the number M of nodes that have moved in the ad hoc network during a given period and the total number N of nodes; nodes that join or quit the ad hoc network during this period can also be considered as mobile nodes.

The gateway then, in a step E34, determines the period Si as a function of the activity Ai and the mobility Mi, for example by reading a table indexed by these values.

During a test E36, the gateway verifies whether the activity Ai has decreased. If so, it reduces the values TTL and Si during a step E38.

The test E36 or the step E38 of reducing the values TTL and Si terminates the process P3.

In the process P4 executed regularly by the general step E1, a gateway 25, 26 verifies during a step E50 if it has received a request from the entity 3 of the Internet 2 to adjust the TTL depth in order to improve load and balancing between the various gateways. If not, the process P4 terminates.

If such a request has been received, the gateway adjusts the TTL value during a step E52 that terminates the process.

The process P5 is used by the gateway 25, 26 to broadcast advertisements messages.

During a test E40, the gateway verifies that the period Si has elapsed since the last broadcast of the advertisement message.

If so, the gateway takes into account any request for adjustment of the TTL depth (step E42) and then broadcasts the advertisement message, during a step E44, to all the gateway nodes to be listed in its topology table.

This broadcast terminates the process P5.

The process Q2 executed by a node on reception of an advertisement message is described below with reference to FIG. 5.

It is assumed that a node receives an advertisement message either from a gateway (if the node is a gateway node) or from another node during a step F20.

During a test F21, the node determines whether it is registered as a gateway node in the topology table of the gateway at the source of the broadcast message. If so, the node inserts into the message, during a step F22, a measurement L-QoS of the quality of the link between that gateway node and the gateway.

The subsequent steps of the process Q2 are executed whether the node is a gateway node or not.

During a step F23, the node decrements by one unit the value of the TTL depth contained in the advertisement message.

Then, during a test F24, the node determines whether the TTL value obtained in this way is strictly positive.

If so, this means that the node is still in the proactive area.

During a test F29, the node verifies whether it has already received the invitation message from other gateway nodes. If not, it broadcasts the invitation message in the ad hoc network during a step F32.

If so, in the implementation described here, the node refrains from rebroadcasting advertisement message or messages received from some gateway nodes.

To this end, the node determines during a step F30 a parameter E-QoS representing a measurement of the end-to-end quality of service for all possible paths between that node and the gateway.

In the implementation described here, this parameter E-QoS is obtained, for a given path, by linear combination of the measurement L-QoS representing the quality of the link between the gateway and the gateway node and a measurement P-QoS of the quality of service of the path between the gateway node and the node 10.

The measurement L-QoS is obtained directly in the advertisement message. How the measurement P-QoS is obtained is described below.

Then, during a step E31, the node refrains from rebroadcasting the invitation messages received from the gateway nodes offering an end-to-end quality of service E-QoS that is relatively low compared to the others.

The other advertisement messages are broadcast during the step E32 already described.

If, during a test F24, the node determines that the TTL value is not strictly positive, this means that the node is outside the proactive area.

The node then verifies, during a test F25, if it knows of at least one active source located outside that area. In the implementation described here, it does this by reading a table Source_Info stored in the random-access memory 52 of the node and management of which is described below.

If the node 10 does not know of any active source outside the proactive area, the process Q2 terminates.

Otherwise, the node 10 sets the TTL value to 1 in the advertisement message during a step F26.

Before broadcasting this advertisement message to extend the proactive area towards the active sources, the node determines, during a test F27, whether bandwidth optimization is in force or not.

If so, the test F27 is followed by a step F28 during which the advertisement message is sent only to the nodes able to set up a path to said at least one active source.

If not, the advertisement message is broadcast in the network as already described, where applicable taking account of reception of the same advertisement message from a plurality of gateway nodes.

The process Q3 executed by a node of the ad hoc network to route data received from an active source is described below.

This data is received by the node concerned during a step F40.

During a step F42, this node updates its Source_List table by listing in it the source of the data and the number of hops between that source and the gateway. As described above, this node uses this table to verify whether it knows of active sources outside the proactive area or not.

Then, during a step F44, the node 10 updates the quality measurement E-QoS of all possible paths between that source and a gateway node known to the node. As described above, this measurement is used subsequently to refrain from of broadcasting an advertisement message from a gateway node offering a relatively low end-to-end quality E-QoS.

The node then selects the best path to the gateway during a step F46 and then routes the data over that path during a step F48.

This routing step terminates the process Q3.

In the implementation described here, in a process Q4 each node also monitors the activity of the sources declared active in its Source_Info table.

To be more precise, if a node detects during a step F50 that a source that was active is no longer active, it eliminates it from its Source_Info table during a step F52.

The invention claimed is:

1. A method of managing a hybrid telecommunications network that can be implemented by a gateway between an ad hoc network and a fixed network, the method comprising:
    selecting, from among candidate nodes of said ad hoc network that are determined to be located one hop from said gateway and that have connectivity with said gateway that is above a predetermined threshold, at least one gateway node for relaying at least part of the traffic between other nodes of the ad hoc network and said gateway;
    broadcasting only to said at least one gateway node an advertisement message including a route to said gateway; and
    determining a depth defining a proactive area of said network in order to maximize a gain taking account of the number of active sources in said proactive area and of a cost criterion.

2. The management method according to claim 1, comprising a step of calculating a period taking account of an activity and of a mobility of the nodes of said ad hoc network and a step of waiting for said period between two successive broadcasts of said advertisement message.

3. The management method according to claim 1, comprising a step of adjusting said depth to satisfy at least one rule aiming to improve the distribution of said traffic between said gateway and at least one other gateway neighbor of said gateway.

4. The management method according to claim 1, comprising a step of reducing said depth and a period between two successive broadcasts of said advertisement message if the activity of the nodes of said ad hoc network decreases.

5. A computer program stored on a computer memory and executing on a processor which, when used in a network apparatus, causes the processor to execute the steps of a management method comprising:
    selecting, from among candidate nodes of said ad hoc network that are determined to be located one hop from said gateway and that have connectivity with said gateway that is above a predetermined threshold, at least one gateway node for relaying at least part of the traffic between other nodes of the ad hoc network and said gateway;
    broadcasting only to said at least one gateway node an advertisement message including a route to said gateway; and
    determining a depth defining a proactive area of said network in order to maximize a gain taking account of the number of active sources in said proactive area and of a cost criterion.

6. A non-transitory computer-readable storage medium storing a computer program comprising instructions for executing the steps of a management method comprising:
    selecting, from among candidate nodes of said ad hoc network that are determined to be located one hop from said gateway and that have connectivity with said gateway that is above a predetermined threshold, at least one gateway node for relaying at least part of the traffic between other nodes of the ad hoc network and said gateway;
    broadcasting only to said at least one gateway node an advertisement message including a route to said gateway; and
    determining a depth defining a proactive area of said network in order to maximize a gain taking account of the number of active sources in said proactive area and of a cost criterion.

7. A gateway adapted to be used in a hybrid telecommunications network between an ad hoc network and a fixed network, comprising:
    means for selecting, from among candidate nodes of said ad hoc network that are determined to be located one hop from said gateway and that have connectivity with said gateway that is above a predetermined threshold, at least one gateway node for relaying at least part of the traffic between other nodes of the ad hoc network and said gateway;
    broadcasting only to said at least one gateway node an advertisement message including a route to said gateway; and determining a depth defining a proactive area of said network in order to maximize a gain taking account of the number of active sources in said proactive area and of a cost criterion.

8. A data transfer method that can be implemented by a node of an ad hoc network, comprising:

verifying, by said node, whether said node is located one hop from a gateway between said ad hoc network and a fixed network and whether said node has connectivity with said gateway above a predetermined threshold; and, if so:

requesting registering of said node by said gateway as a gateway node for relaying at least part of the traffic between other nodes of the ad hoc network and said gateway;

receiving an advertisement message including a route to said gateway;

rebroadcasting said advertisement message in said ad hoc network if said node is located in a proactive area of said network defined by a depth fixed by said gateway; and extending said proactive area during which said node rebroadcasts said advertisement message if that node knows of at least one active source in said ad hoc network separated from said gateway by a number of hops greater than said depth.

9. The transfer method according to claim 8, comprising a step during which said node, having received a plurality of said advertisement messages, refrains from rebroadcasting at least one of said advertisement messages if it is received from a gateway node offering a quality of service below a predetermined threshold.

10. The transfer method according to claim 8, comprising:

if said node is registered as a gateway node, a step of inserting into said advertisement message a measurement of the quality of the link between this gateway node and said gateway; and, in all circumstances:

a step of updating a measurement representing the quality of at least some existing paths between that node and said at least one gateway node; and a step of selecting one of said paths for routing the traffic to said gateway according to said measurements.

11. A node of an ad hoc network, comprising:

means for verifying whether said node is located one hop from a gateway between said ad hoc network and a fixed network and whether it has connectivity with said gateway above a predetermined threshold; and means for requesting its registering by said gateway as a gateway node for relaying at least part of the traffic between other nodes of the ad hoc network and said gateway;

means for receiving an advertisement message including a route to said gateway;

means for rebroadcasting said advertisement message in said ad hoc network if said node is located in a proactive area of said network defined by a depth fixed by said gateway; and means for extending said proactive area during which said node rebroadcasts said advertisement message if that node knows of at least one active source in said ad hoc network separated from said gateway by a number of hops greater than said depth.

12. A computer program stored on a computer memory and executing on a processor which, when used in a network apparatus, causes the processor to execute the steps of a transfer method comprising:

selecting, from among candidate nodes of said ad hoc network that are determined to be located one hop from said gateway and that have connectivity with said gateway that is above a predetermined threshold, at least one gateway node for relaying at least part of the traffic between other nodes of the ad hoc network and said gateway;

broadcasting only to said at least one gateway node an advertisement message including a route to said gateway; and determining a depth defining a proactive area of said network in order to maximize a gain taking account of the number of active sources in said proactive area and of a cost criterion.

13. A non-transitory computer-readable storage medium storing a computer program including instructions for executing the steps of a transfer method comprising:

selecting, from among candidate nodes of said ad hoc network that are determined to be located one hop from said gateway and that have connectivity with said gateway that is above a predetermined threshold, at least one gateway node for relaying at least part of the traffic between other nodes of the ad hoc network and said gateway;

broadcasting only to said at least one gateway node an advertisement message including a route to said gateway; and determining a depth defining a proactive area of said network in order to maximize a gain taking account of the number of active sources in said proactive area and of a cost criterion.

14. A system for discovering a gateway and routing data towards that gateway in a hybrid telecommunications network comprising:

a gateway according to claim 7; and a plurality of nodes of an ad hoc network, with each node comprising:

means for verifying whether said node is located one hop from a gateway between said ad hoc network and a fixed network and whether it has connectivity with said gateway above a predetermined threshold; and means for requesting its registering by said gateway as a gateway node for relaying at least part of the traffic between other nodes of the ad hoc network and said gateway.

* * * * *